Oct. 30, 1962  S. SCHULHOFF, JR  3,060,451
VALVE ASSEMBLIES
Filed April 3, 1961
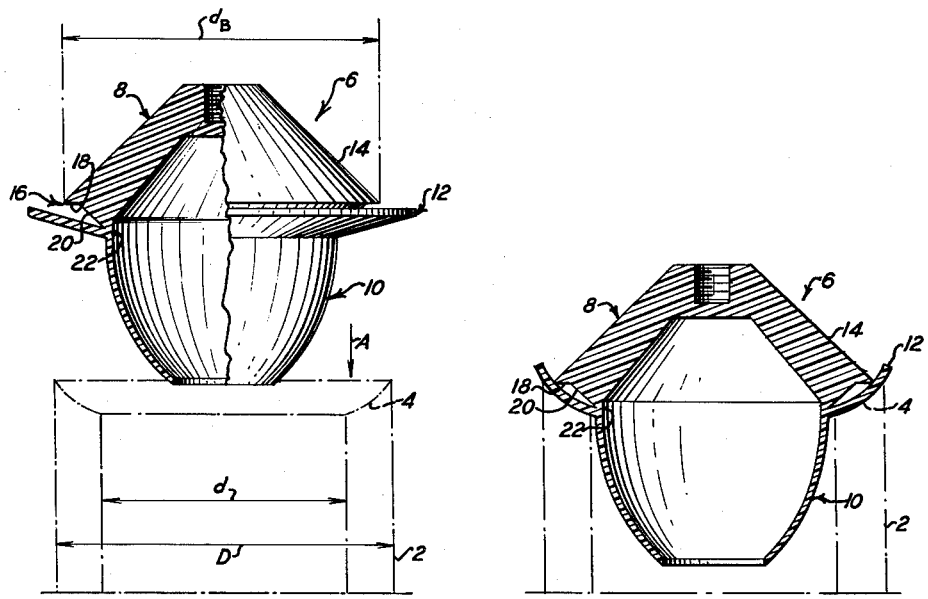
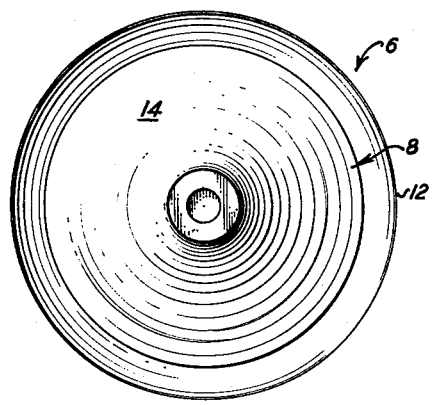
INVENTOR
SAUL SCHULHOFF, JR.
BY *Jacobi & Jacobi*
ATTORNEYS United States Patent Office 3,060,451
Patented Oct. 30, 1962

3,060,451
VALVE ASSEMBLIES
Saul Schulhoff, Jr., 901 S. Dean St., Baltimore 24, Md.
Filed Apr. 3, 1961, Ser. No. 100,295
5 Claims. (Cl. 4—56)

This invention relates to valve assemblies, and in particular to valve assemblies of the type adapted for use in flush closets.

Flush closets in common use today generally comprise a water chamber having therein two valve assemblies—one for controlling the inflow of liquid, and one for controlling the outflow of liquid. The assembly controlling inflow normally comprises a float actuated valve, however, this invention is not concerned with the means for introducing fluid in the chamber and accordingly, it is sufficient for purposes of comprehending of this specification to merely understand that a suitable inflow control is provided.

The present invention is concerned with the outflow control valve, which, in the usual flush closet comprises a valve seat and a valve "ball" reciprocal with respect to said seat. Means are provided including a handle disposed exteriorly of the chamber for causing the ball to be moved from the seat whereby water, or other suitable liquid, can pass through an outlet which the valve seat surrounds. After the chamber has drained to a certain level, the ball, under the action of gravity, again engages the seat, and the tank fills under control of the inflow valve assembly which opens in response to draining of the chamber.

Various types of valve "balls" and valve seats have heretofore been suggested for use in flush closets which operate in the manner described in the preceding paragraph. Generally, the prior constructions incorporate a "ball" or valve body consisting of an at least substantially hollow body having an opening in the bottom thereof, and having a suitable coupling in the top thereof whereby the ball can be attached to a rod supporting the ball for reciprocal movement with respect to the valve seat. The present invention conforms with the prior art as to these features just mentioned. At the same time, it departs from prior art suggestions as to the construction of the valve body, as to the sealing characteristics of the valve body, and in certain instances, as to the formation of the valve seat.

The primary object of the present invention is to provide an improved valve ball or body adapted to form an improved seal with a cooperating valve seat; or, more specifically, the primary object of the present invention is to provide an improved ball valve having thereon means for forming a primary seal with the valve seat, and means cooperating with the means for forming a primary seal to effect a secondary seal.

Yet, further, and more specific objects of the present invention are: (1) to provide an improved ball valve or valve body for use in a flush closet, which ball valve carries a flexible sealing membrane extending therearound adapted to conform with a valve seat; (2) to provide such an improved ball which insures a substantial sealing area, and an increase over sealing areas obtained with prior art constructions, yet which does not depend on the flexible membrane carried thereby for seating support; (3) to provide such an improved ball which is formed with a head portion and a depending skirt portion, wherein the base of the head portion is adapted to cooperate with the valve body membrane projecting therebelow whereby the base forms a pressure surface and insures positive sealing; and (4) to provide an improved valve ball conforming with the preceding objects which is inexpensive in manufacture, trouble-free in operation, and, in addition, which may be formed as an integral single molded unit.

In its broad and simplest aspects, the invention provides a hollow flush tank valve body, comprising a head portion, an integral skirt portion depending from the head portion, and a laterally projecting flexible membrane coupled to the skirt portion adjacent the junction thereof with the head portion, the flexible membrane encircling the skirt portion and extending laterally beyond the base of the head portion whereby when the body seats, the membrane conforms with the seat and forms a primary seal, and the base of the head portion cooperates with the membrane to form a secondary seal.

The invention will be better understood, and objects other than those specifically set forth above, will become apparent, when consideration is given to the following detailed description. The description refers to the annexed drawings presenting the preferred and illustrative embodiment of the invention, wherein:

FIGURE 1 is a side view, partially in section, of a valve assembly constructed in accordance with the present invention—FIGURE 1 showing the ball or body member of the valve assembly disposed above the seat therefor;

FIGURE 2 is a top plan view of the ball member of the assembly shown in FIGURE 1; and FIGURE 3 is a side view, similar to FIGURE 1, but showing the ball member of the assembly in seated position.

In the drawings, the numeral 2 designates an outlet pipe, the top of which is formed to provide a vertically tapered valve seat 4. The ball or reciprocal valve body generally designated by the numeral 6 cooperates with seat 4. The body 6 comprises a head portion generally designated by the numeral 8, a skirt portion generally designated by the numeral 10, and a laterally projecting membrane generally designated by the numeral 12.

The head portion 8 preferably has a tapered outer surface 14, and is dimensioned so that the base 16 of the head portion has an outer dimension which is greater than the inner dimension of the valve seat but less than the outer dimension of the valve seat. As shown, the outlet conduit 2 is cylindrical, and all portions of the valve body 6 have generally circular contours. Accordingly, the inner dimension of the valve seat 4 is the inner diameter thereof designated in the drawings as $d$ and the outer dimension of the valve seat is the outer diameter thereof designated as D. The diameter $d_B$ of the head portion of the valve body is thus greater than $d$ but smaller than D.

The base 16 of the head portion 8 comprises a horizontal planar lip 18 extending inwardly from the bottom edge of the outer surface 14, and a downwardly sloped inwardly directed surface 20 which extends between the inner edge of lip 18 and the top of skirt portion 10.

The membrane 12 which effects a primary seal, as explained herein below, extends laterally of the body around the periphery thereof beyond lip 18. The body member 6 is formed of a suitable rubber, as customary of valves of this type, or other suitable elastic material. The membrane 12 is, in accordance with the preferred embodiment of the invention, formed integrally with the valve body 6 and is carried adjacent the junction 22 of the skirt portion with the head portion 8. The skirt portion 10 is formed as a spheroid and serves to guide the valve body into seated position, as explained in more detail below. The skirt portion and head portion of the valve body are hollow so as to form an air chamber within the valve body.

In operation, after the valve body has been lifted clear of the valve seat so that it assumes the position shown in FIGURE 1, then as the water level in a flush closet (not shown) within which the assembly is disposed descends, the ball moves downwardly in the direction of arrow A. It is guided into seating position, as suggested, by the skirt portion 10. Initially, as the ball descends, the planar membrane 12 which is directed at an upward incline with respect to the longitudinal axis of the ball member, engages the valve seat 4. Once the ball member engages the valve seat, the outlet to the closet is closed. As water enters the closet in accordance with conventional practice, the same fills the chamber, and the pressure caused by the water, forces the valve body 6 into the valve seat. During this process the flexible membrane 12 contacts and conforms with the contour of valve seat 4. As the ball continues into the valve seat, the outer edge of lip 18 engages the membrane 12 as shown in FIGURE 3. The membrane 12 forms a primary seal against the valve seat 4 and the lip 18 forms a secondary seal. The outer edge of the lip 18, in effect, is a pressure edge.

By virtue of the dimensions of the lip 18, the same serves, aside from providing a secondary seal, to prevent the ball from seating too deeply in the valve seat. As appreciated by those of ordinary skill in the art, if the ball were to seat too deeply, the release of the ball from the valve seat would be extremely difficult. The same would be true in the event of abnormally high pressure within the chamber. The lip 18, and dimensioning of the base of the head portion 8, serves to prevent the necessity for unduly high releasing force, as well as to prevent the ball from passing through the valve altogether.

It is important to understand that with the present invention, the base 16 of head portion 8 serves to support the ball in the seated position, and that the membrane does not serve as support. It is this construction which permits making the membrane thin so that it will readily conform with the contour of the seat. The flexibility of the membrane 12 is what insures a positive seal, and the dimensions of the base of the head portion 8 are what insure proper seating.

By providing the downwardly tapering wall portion of surface 20 and the horizontally disposed lip 18 projecting outwardly thereof, the outer edge of lip 18 serves as a pressure edge. Such pressure edge presses against the membrane thereadjacent so as to effect a tight secondary seal.

After reading the foregoing detailed description of the illustrative and preferred embodiments of the present invention, it should be apparent that the objects set forth at the outset of this specification have been successfully achieved. Accordingly, what is claimed is:

1. A hollow seatable flush tank valve body comprising a head portion, an integral skirt portion depending from said head portion, said skirt portion having a cross-section smaller than the base of said head portion, the base of said head portion terminating at its lateral extremity in a circular at least generally pointed projecting tip and a laterally projecting flexible membrane coupled to said skirt portion adjacent the junction thereof with said head portion, said flexible membrane encircling said skirt portion and extending under and laterally beyond said base of said head portion, said membrane normally extending in spaced relation to said tip, whereby when said body seats said membrane conforms with the seat and forms a primary seal, and the base of said head portion cooperates with said membrane to form a secondary seal.

2. A seatable flush tank valve body as defined in claim 1 wherein said membrane is formed integrally with said body.

3. A hollow seatable flush tank valve body as defined in claim 1 wherein said base of said head portion comprises a horizontal planar lip extending inwardly of the periphery of said head portion, and a downwardly sloped inwardly directed surface extending between the inner edge of said lip and said skirt portion.

4. A hollow seatable flush tank valve body as defined in claim 3 wherein said membrane is coupled to said skirt portion at the inner lower end of said downwardly sloped surface.

5. A hollow seatable flush tank valve body as defined in claim 4 wherein said head portion has an outer frusto-conical contour, and said skirt portion has an outer spheroidal contour.

References Cited in the file of this patent

UNITED STATES PATENTS

| | | |
|---|---|---|
| 1,230,929 | Schier | June 26, 1917 |
| 1,304,432 | Williamson | May 20, 1919 |
| 2,174,706 | Pardieck | Oct. 3, 1939 |
| 2,589,110 | Meltsner | Mar. 11, 1952 |
| 2,632,895 | Teaken | Mar. 31, 1953 |